(12) United States Patent
Piatt et al.

(10) Patent No.: US 7,298,531 B2
(45) Date of Patent: Nov. 20, 2007

(54) DIGITAL IMAGE OPTIMIZATION INCORPORATING PAPER EVALUATION

(75) Inventors: Michael J. Piatt, Dayton, OH (US); Terry Wozniak, Springfield, OH (US); Wilson P. Rayfield, Centerville, OH (US); Jennifer L. Addis, Dayton, OH (US)

(73) Assignee: Eastman Kodak Company, Rochester, NY (US)

( * ) Notice: Subject to any disclaimer, the term of this patent is extended or adjusted under 35 U.S.C. 154(b) by 1051 days.

(21) Appl. No.: 10/008,818

(22) Filed: Nov. 13, 2001

(65) Prior Publication Data

US 2003/0090532 A1    May 15, 2003

(51) Int. Cl.
G03F 3/08    (2006.01)
(52) U.S. Cl. .................. 358/504; 358/501; 358/502
(58) Field of Classification Search ............... 358/504, 358/502, 501
See application file for complete search history.

(56) References Cited

U.S. PATENT DOCUMENTS

| | | | |
|---|---|---|---|
| 5,260,806 A * | 11/1993 | Samworth | 358/3.01 |
| 5,532,838 A * | 7/1996 | Barbari | 358/400 |
| 5,995,714 A * | 11/1999 | Hadley et al. | 358/1.9 |
| 5,999,175 A | 12/1999 | Nalder | |
| 6,002,394 A * | 12/1999 | Schein et al. | 725/39 |
| 6,006,013 A | 12/1999 | Rumph et al. | |
| 6,115,747 A * | 9/2000 | Billings et al. | 709/231 |
| 6,175,872 B1 * | 1/2001 | Neumann et al. | 709/231 |
| 6,215,562 B1 * | 4/2001 | Michel et al. | 358/1.9 |
| 6,331,042 B1 | 12/2001 | Yamada | |

FOREIGN PATENT DOCUMENTS

| | | |
|---|---|---|
| EP | 1 006 712 | 6/2000 |
| EP | 1 152 597 | 11/2001 |
| GB | 2 331 383 | 5/1999 |
| GB | 2 352 071 | 1/2001 |
| GB | 2 365 556 | 2/2002 |
| GB | 2 377 583 | 1/2003 |
| WO | WO99/49383 | 9/1999 |
| WO | WO 01/52477 A2 | 7/2001 |
| WO | WO 02/15026 A1 | 2/2002 |

OTHER PUBLICATIONS

FaxPress 6.3 Information Sheet; http://www.castelle.com/products/faxpress/6.3/6.3_Information.html, Jan. 4, 2003, pp. 1-10.
Search Report dated Apr. 2, 2003 from the U.K Patent Office in corresponding U.K Patent Application No. GB 0224571.0 of Hewlett-Packard Co.

* cited by examiner

*Primary Examiner*—Kimberly Williams
*Assistant Examiner*—Michael Burleson

(57) ABSTRACT

A system and method are provided for determining ink jet printing system parameters by selecting an appropriate linearizing transformation for application to images to be printed on a printing system for a specific substrate. These transformations can be any transformation capable of being applied in graduated increments and having a corresponding incremental visual influence on the printed output. The present invention allows the user to determine multiple parameters for the printer, including for example, tone scale correction, determination of upper ink limits, amount of under color removal, and allows the user to identify the proper ink level for optimum quality of graphics and/or text printing.

15 Claims, 4 Drawing Sheets

FIGURE 1

DIGITAL IMAGE OPTIMIZATION INCORPORATING PAPER EVALUATION

TECHNICAL FIELD

The present invention relates to image processing, and, more particularly, to optimization of an image on a printing system by selection of tone scale transformations through visual examination of specially designed test pages.

BACKGROUND ART

Various techniques are known for digital printers to provide continuous tone (monochrome or color) printing. Traditional offset printing systems compensate for tone nonlinearity through the measurement of dot gain. Dot gain is the percentage of spot size increase of a 50% intensity dot. This dot gain is corrected in the production of the printing plates. Further correction can be done through adjustment of the pressure between the transfer media and the printing plate. The object is to obtain a linear tone scale from the lightest to the darkest shade of a given ink in the printing system.

High speed digital ink jet printing systems apply the ink directly to the substrate as directed by the input data. In certain digital printing systems the application of a linear gradation of ink to a substrate does not result in the appearance of a linear gradation in tone. The image data must be corrected so that tone linearity can be achieved on a particular substrate. In the past, it has been necessary to print and measure the resulting tone from samples of a number of printed ink levels in order to determine the appropriate data transformation. This transformation was then applied to the image data.

Typically, printing system configurations and substrates differ in acceptable maximum ink limit. Problems in image quality, such as edged definition and loss of detail in the shadow areas, can result. Image quality and ink drying time varies significantly with the substrate As conditions of the printing system and substrate type change regularly, it is often necessary to determine new data transformations that redefine the tone curve shape and upper ink limit for each ink in the system.

It would be desirable to be able to determine an appropriate transformation for application to images to be printed on the given system and substrate.

SUMMARY OF THE INVENTION

The present invention relates to a determination of an appropriate linearizing transformation for application to images to be printed on a printing system for a specific substrate. These transformations are determined using limited data from a series of test pages printed on specific printing system and substrate. The data gathered from the test pages allows the user to identify the transformation necessary to generate a linear tone scale for the given substrate. The present invention also allows the user to identify the proper ink level for quality text printing, and to set a limit on the maximum amount of ink that will be applied to the substrate.

In accordance with one aspect of the present invention, a system and method are provided for determining ink jet printing system parameters by selecting an appropriate linearizing transformation for application to images to be printed on a printing system for a specific substrate. These transformations can comprise any transformation capable of being applied in graduated increments and having a corresponding incremental visual influence on the printed output. The present invention also allows the user to determine multiple parameters for the printer, including for example, tone scale correction, determination of upper ink limits, amount of under color removal, and allows the user to identify the proper ink level for optimum quality of graphics and/or text printing.

Other objects and advantages of the invention will be apparent from the following description, the accompanying drawings and the appended claims.

BRIEF DESCRIPTION OF THE DRAWINGS

FIG. 1 illustrates a test pattern devised for a business color press that is targeted at applications such as catalogs, direct mail, book publishing, and business forms;

DETAILED DESCRIPTION OF THE PREFERRED EMBODIMENTS

Figure 2:
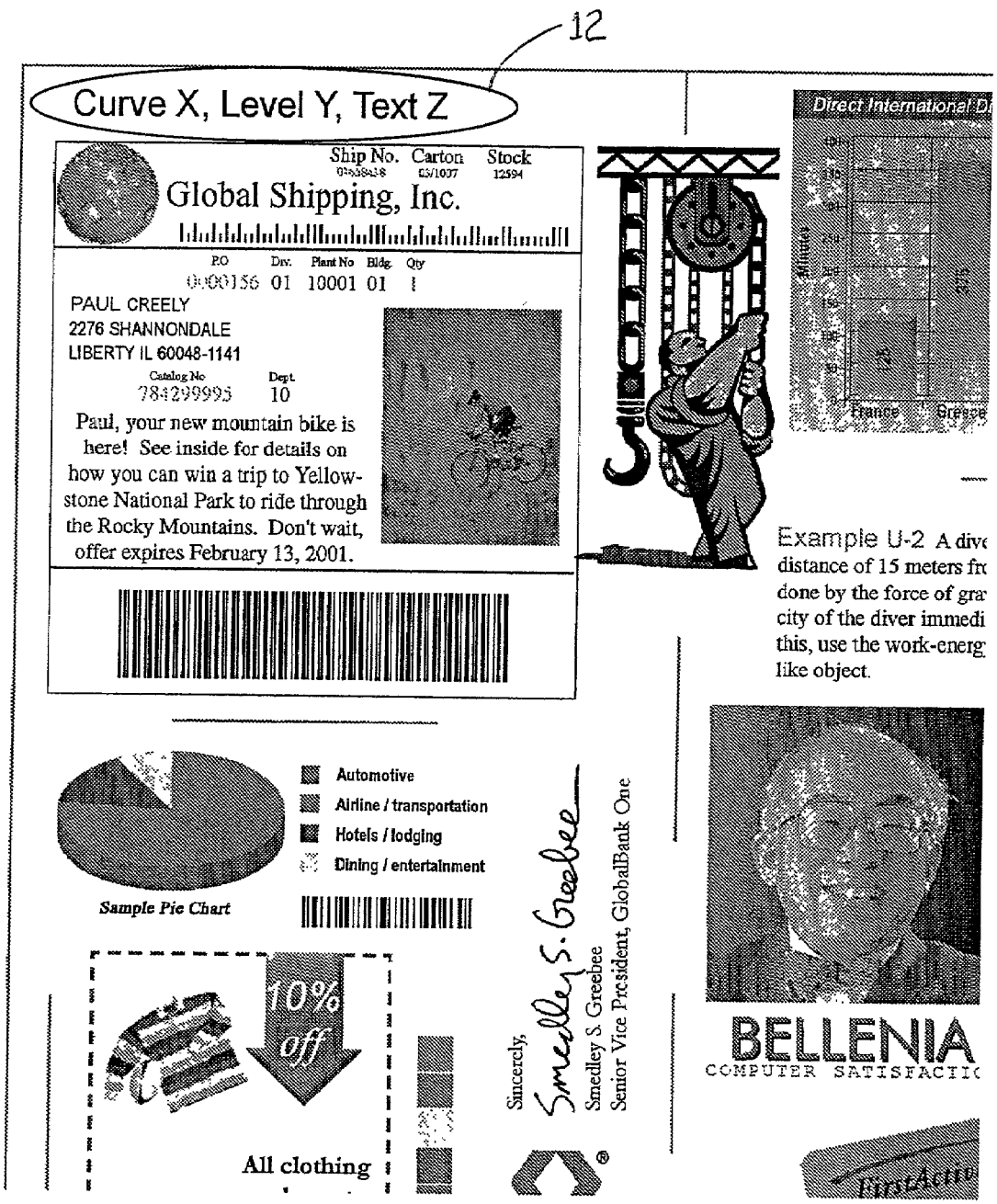
FIG. 2 uses an identifying code to uniquely specify the curve set used to process each given test page in the job.

The present invention identifies a simplified method for identifying the most appropriate transformations for text and/or graphics printed on a known printing system and on a known substrate. The method of the present invention can be used to derive a transformation through visual inspection of a set of predefined printed test sheets. The test sheets are printed at the same printer settings as the actual job data for which the procedure is intended. Individual master transformations can be determined for each type of graphics and text in the test image. Further, individual primary color curves can be derived form the master transformations for a specific graphic or text.

Exemplary portions of the description hereafter refer to correction of tone scale, for purposes of illustrating the concept of the present invention. However, it will be understood by those skilled in the art that the concept of the present invention is applicable to determination of various other parameters in ink jet printing systems, and any transformation which can be applied in graduated increments that has a corresponding incremental visual influence on the printed output is within the concept of the present invention.

It is a laborious process to determine the appropriate one dimensional tone scale transformations necessary to obtain balanced color on a multicolored digital printing press. Rigorous methods involve printing out the entire tone scale for each color in the system and measuring the results with a spectrophotometer. This spectrophotometer data is typically fit to a polynomial. Next, an input/output transfer function is derived that is applied to the image data. This transfer function will assure linear tone scale gradations from the lightest to the darkest shade of print for each colorant in the system. Individual transformations are then applied to each color plane of the image data.

It has been determined that the transformation necessary to obtain a linear graduation in tone is very dependent upon the ink/substrates set. This is particularly the case in high speed digital ink jet printings systems. In these systems, droplet dispersion techniques are used to obtain various levels of intensity. Few droplets, spaced far apart, are used to make the highlights. Many droplets, placed close to each other, are used to make the darker areas.

The dwell time, after printing and before drying the ink, has a strong influence on individual dot size. This, in turn, has a dramatic effect on the resulting color on the printed sheet. Processed colors, which are made up of droplets from two or more of the primary inks, are particularly sensitive to small shifts in dot size from one or more of the constituents. Therefore, it is important to determine the tone scale transformation for each of the inks at the normal operating speed of the press.

The present invention provides an improved method for determining an appropriate transformation for application to images to be printed on a given system and substrate. The present invention further permits determination of the most appropriate ink loading for text printing. It is not uncommon to have a separate data transformation specifically for text data in order to specifically optimize the quality of text. The system and method described herein allows determination of both the maximum graphics ink limit, as well as the appropriate text printing level. It should be noted, and will be recognized by those skilled in the art, that the concept and the teachings or the present invention can also extended to identify the optimum curve shape and ink limit for specific types of graphics, such as business graphics, photographs, line art, and so forth. The output of this process is the determination of one or more one dimensional transformations of the cyan, magenta, yellow and black (CMYK) input data to achieve linear tone response on the printed image.

Although it is often advantageous to derive exact linearization tone scale correction curves by conventional methods, it is not always practical or necessary to do so. Many, if not all, linearization transformation curves are well behaved monotonic functions. Further, for a specific printing engine, one can experimentally derive the envelope of practical transformations for a range of paper types. Given this information, a series of curves can be derived that bracket the range of interest.

Another important parameter in the characterization of the ink/paper printing system is the determination of the upper ink limit. Most papers can not handle full coverage of each of the primary inks at the same pixel location. The tone scale calibration curve can be used to restrict ink loading on the paper of the individual primary inks in the system. Again, it is possible to identify a range of upper ink limits to cover the optimum selection for a number of paper stocks. Combining these variables allows one to develop a predetermined set of curves of which one of the set will be appropriate for a specific ink/paper pair.

When applying the concept of the present invention to determining the tone correction scale parameter for an ink jet printer, a set of predefined transfer functions and upper ink limits are used to allow a press operator to identify the proper transfer function without making any complex measurements. No instrumentation is required to identify a usable set of linearization curves for each primary color in the system. The present invention proposes a special test pattern that includes graphics representing typical applications for the printing device. The special test patterns can be applied to determine multiple parameters for ink jet printing systems. For example, the technique of the present invention could be used to determine the amount of under color removal, such as by replacing CMY data with some percentage of black ink.

Figure 1:
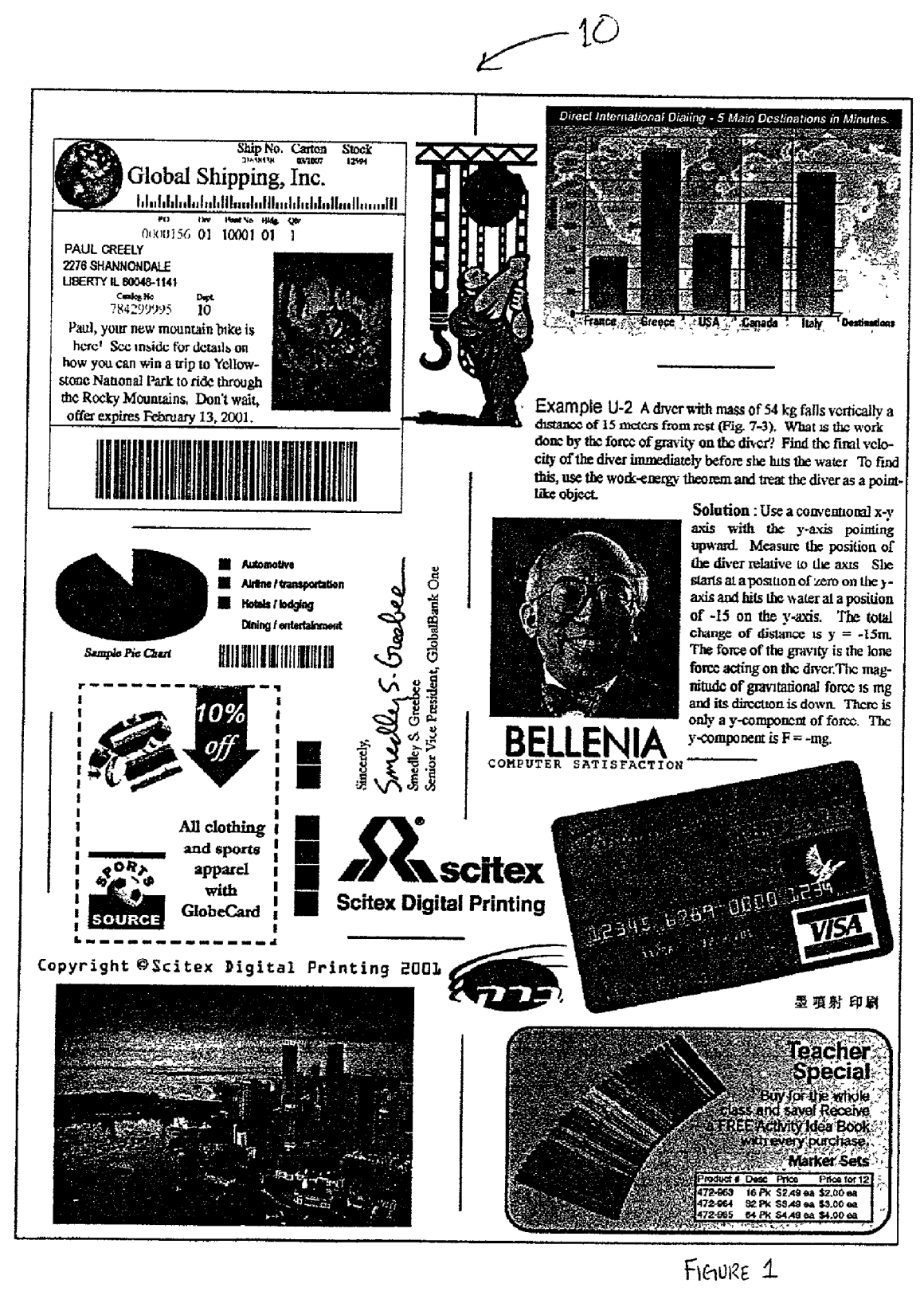

Referring now to the drawings, for the purpose of illustration, FIG. 1 shows a test pattern 10 devised for a business color press that is targeted at applications such as catalogs, direct mail, book publishing, and business forms. Those skilled in the art will recognize that different patterns may be more appropriate for printing systems targeted toward different applications. Initially, an entire job, containing multiple copies of the test image, is assembled. Each page in the job is processed using a unique tone scale transformation curve and/or upper ink limit for each of the primary colors in the press.

FIG. 1 shows a typical test pattern that contains a plurality of different types of image data, including large and small text, continuous tone images, business graphics, line art, photos, and bar codes. FIG. 2, for purposes of clarification, identifies descriptors for the tone curves used to create the page. An identifying code 12, as shown in FIG. 2, uniquely specifies the curve set used to process each given test page in the job. A separate master curve can be identified for each type of graphics and text.

Figure 3:
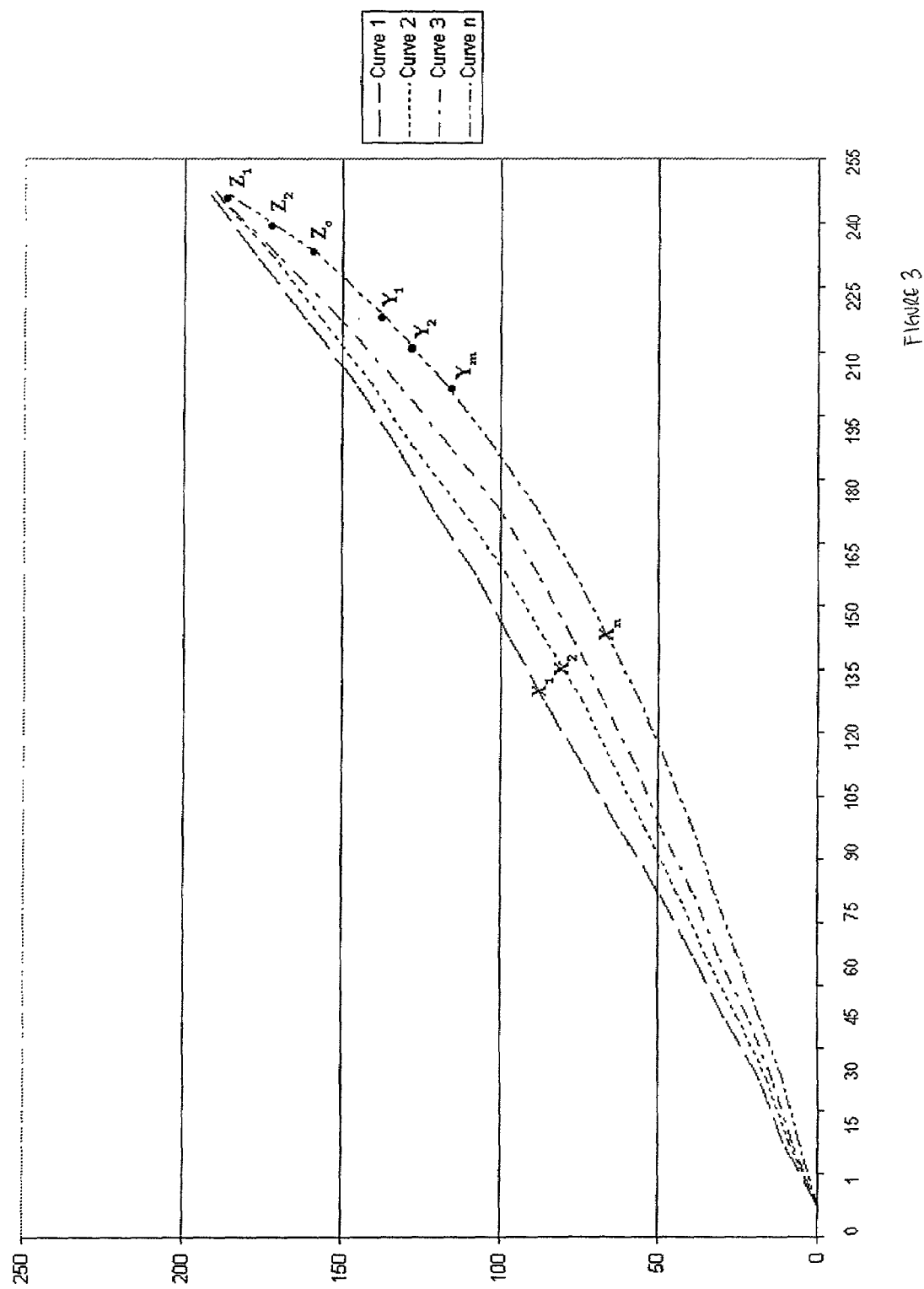
FIG. 3 is a typical family of curves that may be associated with the test page.

FIG. 3 shows a typical family of curves that may be associated with the test page. There are a family of master curve shapes that bracket the practical range of curves shapes for the particular printing system. These curves are typically determined experimentally based on a reasonable sampling of available substrates for a given printing system. There are also a set of corresponding upper ink limits for graphics and for text. These limits are a function of the substrate. The test page has graphics and text that closely represents the real image data. In general, the more ink that is printed, the better an image looks. Typically text can be printed with more ink than graphics. Business graphics can be printed with less ink than text but more than processed color images.

Figure 4:
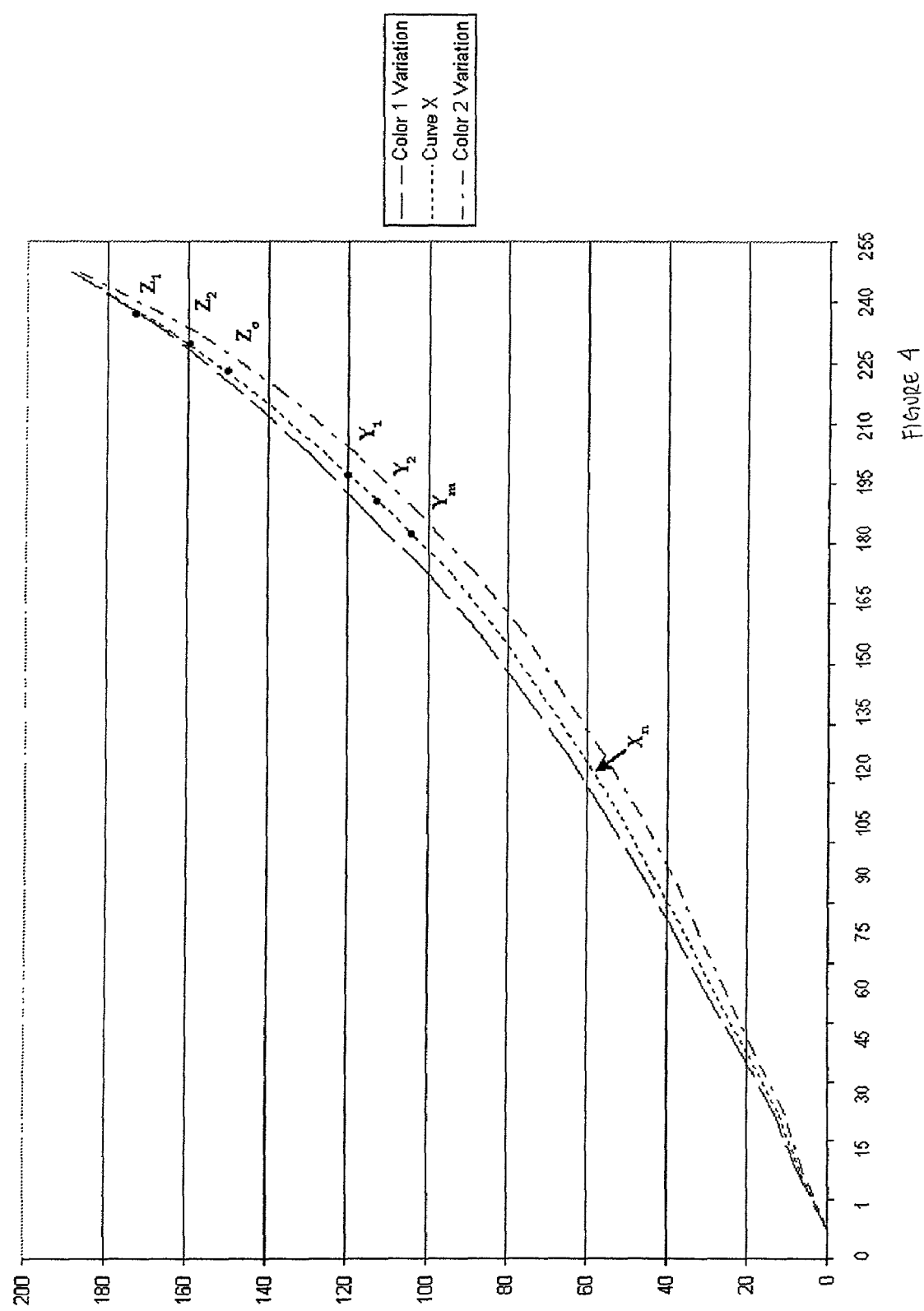
FIG. 4 is a graphic representation of prediction of the best transformation for each color based on selection of the master curve.

A specific curve shape, such as the ones shown in FIG. 3, can be identified for each ink/paper set. These transformations are necessary to create a linear tone scale. The amount of dot spread on a given substrate determines the print density as a function of the amount of ink on the printed substrate, per unit area. In FIGS. 3 and 4, the X-axis is the 8 bit input data value and the Y-axis is the output 8 bit data value that is subsequently processed by the raster image processor (RIP). The RIP creates a tone scale by distributing an increasing number of droplets per unit area, from no print to maximum density. The midtones are most affected by the dot spread because there are sufficient droplets to interact with each other as they spread, but the paper is not yet saturated with ink.

The variables X1 through Xn correspond to different curves that represent the behavior of a particular ink on different substrates. The X curve, therefore, is only a function of ink and substrate. It is independent of the data to be printed. The variables Y1 through Ym represent the upper ink cutoff for a particular type of graphic on the test page. For example, the continuous tone photographs in the test image may require an upper ink limit Ym based on considerations of bleed, show through, and cockle. On another paper, an upper ink limit of Y2 may be appropriate. The upper ink limit Zo may be appropriate for text printing of the same ink on the same substrate. Text coverage is typically only 5% of the area it occupies. Graphic coverage is typically around 25% coverage of the same area. Hence, different upper ink limits will be appropriate for different printing purposes. Another factor is that graphics are usually printed with all four colors, while text is typically only a single color.

While the axis of the curves in FIG. 4 are the same as those for FIG. 3, FIG. 4 relates to specific curves for each ink in the system, as derived from the general or master curve for the system. The upper ink limit is a subjective measurement based on inspection of print quality as a function of the type of image data being printed. Once the general shape of this curve is known, and the upper ink limit is identified, one can derive individual curves for each ink in the system if the relationship between the inks is known in advance. For example, if it has been determined that the yellow ink always spreads about 10% more than the black ink, the specific yellow and black ink curves can be determined from the general shape of the master curve identified in FIG. 3. The general curve shape Xn of FIGS. 3 and 4 has upper ink limits Y and Z based on the data to be printed. The specific ink curves for Color 1 and Color 2 are shown as derived quantities on FIG. 4. The appropriate upper ink limits Y and Z should be added to the derived curves so that they match the master curve.

One feature of the present invention is the use of multiple upper ink limits based on the type of data to be imaged. The operator is asked to identify the proper quality from a number of samples printed on the appropriate substrate. After identification of the best sample of a specific type of graphic, the identifier at the top of that page defines the master tone transformation curve for that specific type of graphics or text.

Often times, the individual inks in a system do not share the exact same optimal tone transformation curve. However, one typically knows the relationship between the responses of the individual inks in the system. Knowing this information allows one to accurately predict the best transformation for each color based on selection of the master curve. This is shown in FIG. 4. The proper transformation for two separate inks in the system is derived from the master. Using this scheme, the best possible transformation is selected.

In applying the method and system of the present invention, a variety of ink jet printer parameters can be determined. Initially, a set of test sheets is created, printed on a known printing system and on a known substrate. The test sheets may comprise a single test job that contains a plurality of individual sheets, with each sheet containing general subject matter that is digitally unique from each of the other of sheets, as a result of specific image processing applied to each page. The test pattern can comprise any suitable printing classification, such as, for example, test printing, process color printing, bar code printing, and/or business graphics. The image processing for each page in a job can include various selections of tone scale correction transformations, graphics upper ink limits, optimum ink limits for text, and other similar transformations.

These test sheets are visually inspected, and at least one transformation is identified. Visual inspection techniques can include over saturation in shadow areas of graphics, excessive bleed between colors, poor text edge definition, show through to the back of the substrate, and so forth. The transformation can be any transformation which can be applied in graduated increments and having a corresponding incremental visual influence on the known substrate. With this information, individual master transformations for each type of graphics and/or text in the test sheets can be selected to optimize print quality for the known substrate on the known printing system.

As previously noted, the optimum transformation is typically a function of the ink, substrate, and type of image data. The master transformation is derived considering each of these variables. Further application of the concept of the present invention allows determination of individual color transformations based upon the master and a known relationship between the inks in the system. Once the proper names have been identified, the full transformations can be accessed from a data base and inserted into the appropriate place in the image processing workflow prior to printing the actual image data.

Individual tone curves can be created for each ink based on visual selection of a master tone curve for a typical graphic on a known substrate printed with a known ink set. Proper data processing algorithms can be identified for a given set of print conditions such as print speed, dryer temperature, finishing equipment (sometimes excessive ink cause paper problems that influence the reliability of sheeters, stackers, folders, etc.), number of colorants in the system (spot color or full processed color), and so forth.

The present invention provides a system and method of determining an appropriate linearizing transformation for application to images to be printed on a printing system for a specific substrate. These transformations are determined using limited data from a series of test pages printed on the specific printing system and substrate. The data gathered from these test pages allows the user to identify the transformation necessary to generate a linear tone scale for the given substrate. The present invention also allows the user set a limit on the maximum amount of ink that will be applied to the substrate, and allows the user to identify the proper ink level best quality text printing.

The system and method for determining ink jet printer parameters includes creating a test pattern, and defining an image transformation having an adjustment parameter(s) which can be applied in graduated increments, the adjustment parameter having a corresponding incremental visual influence on the image. The adjustment parameter(s) can affect maximum inking level in text printing, maximum inking level in graphic printing, and/or inking level of mid tones.

The image transformation is then applied to the test pattern to create test images, using values of the adjustment parameter, such that the test images prepared each have distinct values of the adjustment parameter. The values of the adjustment parameter used to prepare each of the test images are identified, and a set of test sheets of the test images are then created, printed on a known printing system and on a known substrate. These test images are visually inspected, for example, visually inspected for over saturation in shadow areas of graphics, excessive bleed between colors on the printed test sheets, poor text edge definition, show through of the printed image to an opposite side of the substrate, and/or cockle of the printed image. The test image having the preferred image quality on the known printing system and on the known substrate is identified, and the preferred transform parameter values are defined for the adjustment parameter, to define a preferred transform. The preferred transform, with the preferred transform parameter values of the adjustment parameter, are applied, to optimize print quality for the known substrate on the known printing system.

The illustrated test job contains a series of images and associated codes. The codes identify the settings for image transformation prior to the printing process. Most importantly, no special equipment is required to accomplish these tasks. By visually examining the images against a define set of criteria, the proper image settings can be identified.

The invention has been described in detail with particular reference to certain preferred embodiments thereof, but it will be understood that modifications and variations can be effected within the spirit and scope of the invention.

What is claimed is:

1. A method for determining ink jet printer parameters comprising the steps of:

creating a set of test sheets of printed images, printed on a known printing system and on a known substrate;

visually inspecting the set of printed test sheets for inking above an upper ink limit as evidenced by at least one of over saturation in shadow areas of graphics, excessive bleed between colors on the printed test sheets, poor text edge definition, show through of the printed image to an opposite side of the substrate, and cockle of the printed image;

identifying at least one transformation which can be applied in graduated increments, the at least one transformation having a corresponding incremental visual influence on the printed images on the known substrate; and determining individual master transformations for each type of print in the test sheets to optimize print quality for the known substrate on the known printing system.

2. A method as claimed in claim 1 wherein the step of creating a set of test sheets comprises the step of creating a single test job having a plurality of individual sheets.

3. A method as claimed in claim 1 wherein individual color transformations of a spot or processed color system can be derived from selection of the master transformations.

4. A method for determining ink jet printer parameters comprising the steps of:

creating a test pattern;

defining an image transformation having at least one adjustment parameter which can be applied in graduated increments, the at least one adjustment parameter having a corresponding incremental visual influence on the image;

applying the image transformation to the test pattern to create test images, using a plurality of values of the at least one adjustment parameter such that a plurality of test images are prepared each having distinct values of the at least one adjustment parameter;

identifying the values of the at least one adjustment parameter used to prepare each of the test images;

creating a set of test sheets of the test images, printed on a known printing system and on a known substrate;

visually inspecting the set of printed test images for inking above an upper ink limit as evidenced by at least one of over saturation in shadow areas of graphics, excessive bleed between colors on the printed test sheets, poor text edge definition, show through of the printed image to an opposite side of the substrate, and cockle of the printed image;

identifying the test image having preferred image quality on the known printing system and on the known substrate;

using identification means on the identified test image to define preferred transform parameter values for the at least one adjustment parameter to define a preferred transform; and applying the preferred transform with the preferred transform parameter values of the at least one adjustment parameter to optimize print quality for the known substrate on the known printing system.

5. A method as claimed in claim 4 wherein the test pattern comprises a plurality of printing classifications.

6. A method as claimed in claim 5 wherein the plurality of printing classifications comprise at least a printing classification selected from the group consisting of test printing, process color printing, bar code printing, and business graphics.

7. A method as claimed in claim 4 wherein the at least one adjustment parameter affects maximum inking level in text printing.

8. A method as claimed in claim 4 wherein the at least one adjustment parameter affects maximum inking level in graphic printing.

9. A method as claimed in claim 4 wherein the at least one adjustment parameter affects inking level of mid tones.

10. A system for determining ink jet printer parameters comprising:

a test pattern;

an image transformation having at least one adjustment parameter which can be applied in graduated increments, the at least one adjustment parameter having a corresponding incremental visual influence on the image;

means for applying the image transformation to the test pattern to create test images, using a plurality of values of the at least one adjustment parameter such that a plurality of test images are prepared each having distinct values of the at least one adjustment parameter;

means for identifying the values of the at least one adjustment parameter used to prepare each of the test images;

a set of test sheets of the test images, printed on a known printing system and on a known substrate;

means for visually inspecting the set of printed test images for inking above an upper ink limit as evidenced by at least one of over saturation in shadow areas of graphics, excessive bleed between colors on the printed test sheets, poor text edge definition, show through of the printed image to an opposite side of the substrate, and cockle of the printed image;

means for identifying the test image having preferred image quality on the known printing system and on the known substrate;

means for defining preferred transform parameter values for the at least one adjustment parameter to define a preferred transform; and means for applying the preferred transform with the preferred transform parameter values of the at least one adjustment parameter to optimize print quality for the known substrate on the known printing system.

11. A system as claimed in claim 10 wherein the test pattern comprises a plurality of printing classifications.

12. A system as claimed in claim 11 wherein the plurality of printing classifications comprises printing selected from the group consisting of test printing, process color printing, bar code printing, and business graphics.

13. A system as claimed in claim 10 wherein the at least one adjustment parameter affects maximum inking level in text and graphic printing.

14. A system as claimed in claim 10 wherein the at least one adjustment parameter affects inking level of mid tones.

15. A system as claimed in claim 10 wherein the set of test sheets comprises a single test job having a plurality of individual sheets.

* * * * *